United States Patent
Oshitani et al.

(10) Patent No.: US 10,759,258 B2
(45) Date of Patent: Sep. 1, 2020

(54) EJECTOR REFRIGERATION CYCLE DEVICE

(71) Applicant: DENSO CORPORATION, Kariya, Aichi-pref. (JP)

(72) Inventors: Hiroshi Oshitani, Kariya (JP); Hiroshi Mieda, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/307,272

(22) PCT Filed: Apr. 27, 2017

(86) PCT No.: PCT/JP2017/016680
§ 371 (c)(1),
(2) Date: Dec. 5, 2018

(87) PCT Pub. No.: WO2017/212820
PCT Pub. Date: Dec. 14, 2017

(65) Prior Publication Data
US 2019/0217684 A1    Jul. 18, 2019

(30) Foreign Application Priority Data
Jun. 8, 2016    (JP) .................................. 2016-114240

(51) Int. Cl.
*B60H 1/32* (2006.01)
*F25B 1/00* (2006.01)
(Continued)

(52) U.S. Cl.
CPC ............... *B60H 1/323* (2013.01); *B60H 1/22* (2013.01); *B60H 1/32* (2013.01); *F25B 1/00* (2013.01);
(Continued)

(58) Field of Classification Search
CPC . B60H 1/323; B60H 1/32; B60H 1/22; B60H 2001/3298; F25B 1/00; F25B 5/04; F25B 39/00
See application file for complete search history.

(56) References Cited

U.S. PATENT DOCUMENTS

| | | | |
|---|---|---|---|
| 2007/0119207 A1 | 5/2007 | Oshitani et al. | |
| 2008/0264097 A1 | 10/2008 | Ishizaka et al. | |
| 2012/0042686 A1* | 2/2012 | Oshitani | F25B 41/00 62/500 |

FOREIGN PATENT DOCUMENTS

| | | |
|---|---|---|
| JP | H06341732 A | 12/1994 |
| JP | 3486851 B2 | 1/2004 |

(Continued)

*Primary Examiner* — Emmanuel E Duke
(74) *Attorney, Agent, or Firm* — Harness, Dickey & Pierce, P.L.C.

(57) ABSTRACT

An ejector refrigeration cycle device includes: a decompressor that decompresses a refrigerant heat-exchanged in a radiator; a first exterior heat exchanger that exchanges heat between the refrigerant decompressed by the decompressor and outside air; an ejector that decompresses the refrigerant flowing out of the radiator in a nozzle portion and draws another refrigerant heat-exchanged in the first exterior heat exchanger; a branch portion in which the refrigerant heat-exchanged in the radiator branches to a side of the decompressor and a side of the nozzle portion; a second exterior heat exchanger that exchanges heat between the refrigerant pressurized in the ejector and the outside air; a bypass portion that causes the refrigerant heat-exchanged in the radiator to flow to the first exterior heat exchanger while bypassing the decompressor and the nozzle portion; and an opening/closing portion that opens or closes the bypass portion.

7 Claims, 9 Drawing Sheets

(51) Int. Cl.
*B60H 1/22* (2006.01)
*F25B 5/04* (2006.01)
*F25B 39/00* (2006.01)

(52) U.S. Cl.
CPC ................ *F25B 5/04* (2013.01); *F25B 39/00* (2013.01); *B60H 2001/3298* (2013.01)

(56) References Cited

FOREIGN PATENT DOCUMENTS

| | | |
|---|---|---|
| JP | 2006118849 A | 5/2006 |
| JP | 2007057222 A | 3/2007 |
| JP | 2014156143 A | 8/2014 |

\* cited by examiner

AIR-HEATING OPERATION

AIR-COOLING OPERATION

DURING AIR-HEATING OPERATION

DURING DEFROSTING OPERATION OR DURING AIR-COOLING OPERATION

DURING AIR-HEATING OPERATION

DURING DEFROSTING OPERATION OR DURING AIR-COOLING OPERATION

EJECTOR REFRIGERATION CYCLE DEVICE

CROSS REFERENCE TO RELATED APPLICATIONS

This application is a U.S. National Phase Application under 35 U.S.C. 371 of International Application No. PCT/JP2017/016680 filed on Apr. 27, 2017. This application is based on and claims the benefit of priority from Japanese Patent Application No. 2016-114240 filed on Jun. 8, 2016. The entire disclosures of all of the above applications are incorporated herein by reference.

FIELD OF THE INVENTION

The present disclosure relates to an ejector refrigeration cycle device that includes an ejector.

BACKGROUND ART

Conventionally, for example, Patent Document 1 describes an air conditioner that includes a refrigeration cycle capable of switching between an air-cooling operation and an air-heating operation. In the related art, such a refrigeration cycle includes a compressor, a first heat exchanger, a second heat exchanger, a third heat exchanger, a first expansion device, and a second expansion device.

The first heat exchanger is disposed in an air conditioning duct and has its air ventilation volume adjusted by a damper. The second heat exchanger is disposed on an upstream side with respect to the first heat exchanger within the air conditioning duct. The third heat exchanger is disposed outside the air conditioning duct.

These devices form a loop by connecting the compressor, the first heat exchanger, the first expansion device, the third heat exchanger, a first on/off valve, the second expansion device, and the second heat exchanger in this order with respect to the flow of a refrigerant.

A refrigerant passage, which is opened or closed by a second on/off valve, is provided between the inflow and outflow sides of the first expansion device. Another refrigerant passage, which is opened or closed by a third on/off valve, is provided between the outflow side of the first heat exchanger and the inflow side of the second expansion device. A further refrigerant passage, which is opened or closed by a fourth on/off valve, is provided between the outflow side of the third heat exchanger and the suction side of the compressor.

During the air-cooling operation, the first on/off valve and the second on/off valve are opened, the third on/off valve and the fourth on/off valve are closed, and the damper is set to a position where the air ventilation volume in the first heat exchanger is eliminated. Thus, the refrigerant discharged from the compressor passes through the first heat exchanger without dissipating any heat in the first heat exchanger, then passes through the first on/off valve, and subsequently dissipates heat in the third heat exchanger. Thereafter, the refrigerant is decompressed in the second expansion valve and then absorbs heat in the second heat exchanger. In this case, the air fed from the upstream side within the air conditioning duct is cooled down when passing through the second heat exchanger and then supplied to a space to be temperature-controlled while bypassing the first heat exchanger.

During the air-heating operation, the fourth on/off valve is opened, the first on/off valve, the second on/off valve, and the third on/off valve are closed, and the damper is set to a position where the air ventilation volume in the first heat exchanger is maximized. Thus, the refrigerant discharged from the compressor dissipates heat in the first heat exchanger and is then decompressed in the first expansion device. Subsequently, the refrigerant absorbs heat in the third heat exchanger and is returned to the compressor without passing through the second heat exchanger. In this case, the air fed from the upstream side within the air conditioning duct does not exchange any heat in the second heat exchanger and is heated when passing through the first heat exchanger to be supplied to the space to be temperature-controlled.

RELATED ART DOCUMENT

Patent Document

Patent Document 1: Japanese Unexamined Patent Application Publication No. 6-341732

SUMMARY OF INVENTION

According to studies conducted by the inventors of the present application, when the refrigerant evaporation pressure in the third heat exchanger is reduced to secure the air heating capacity during the air-heating operation, a driving power for the compressor is increased, thus deteriorating a cycle efficiency, known as the coefficient of performance (COP), and consequently making it difficult to surely achieve both the air heating capacity and the cycle efficiency. This matter becomes remarkable at an ultralow temperature.

Accordingly, it is an object of the present disclosure to improve both the air heating capability and the cycle efficiency during an air-heating operation of a refrigeration cycle device which is capable of switching between the air-heating operation of absorbing heat into the refrigerant in an exterior heat exchanger and another operation of dissipating heat from the refrigerant in the exterior heat exchanger.

An ejector refrigeration cycle device includes:
a compressor that draws, compresses, and discharges a refrigerant;
a radiator that exchanges heat between the refrigerant compressed by the compressor and air to be blown into a space to be air-conditioned;
a first decompressor that decompresses the refrigerant heat-exchanged in the radiator;
a first exterior heat exchanger that exchanges heat between the refrigerant decompressed in the first decompressor and outside air;
an ejector including a nozzle portion that decompresses the refrigerant flowing out of the radiator, a refrigerant suction port that draws the refrigerant heat-exchanged in the first exterior heat exchanger by a suction effect of the refrigerant injected from the nozzle portion, and a pressurizing portion that mixes the refrigerant injected from the nozzle portion and the refrigerant drawn from the refrigerant suction port to pressurize the mixed refrigerant;
a branch portion in which the refrigerant heat-exchanged in the radiator branches to a side of the first decompressor and a side of the nozzle portion;
a second exterior heat exchanger that exchanges heat between the refrigerant pressurized in the ejector and the outside air;

a first bypass portion through which the refrigerant heat-exchanged in the radiator flows to the first exterior heat exchanger while bypassing the first decompressor and the nozzle portion; and an opening/closing portion that opens or closes the first bypass portion.

Thus, when the opening/closing portion closes the first bypass portion, the refrigerant absorbs heat from the outside air in the first exterior heat exchanger and the second exterior heat exchanger. Then, the refrigerant dissipates heat in the radiator into the air, which is to be blown into the space to be air-conditioned. In this way, the air heating operation can be achieved.

When the opening/closing portion opens the first bypass portion, the refrigerant dissipates heat into the outside air in the first exterior heat exchanger and the second exterior heat exchanger.

Consequently, during the air heating operation, the air heating capacity and the cycle efficiency can be improved by the pressurizing effect of the ejector.

That is, during the air heating operation, the first exterior heat exchanger can evaporate the refrigerant at an evaporation pressure that is lower than a suction pressure of the compressor by an amount corresponding to the pressurizing effect at the ejector. Consequently, the refrigerant evaporation temperature at the first exterior heat exchanger can be decreased. Thus, the air heating capacity can be improved. The suction pressure of the compressor can be increased by the pressurizing effect of the ejector, so that the driving power for the compressor can be reduced, thereby improving the cycle efficiency.

Therefore, both the air heating capacity and the cycle efficiency during the air heating operation can be improved.

DESCRIPTION OF EMBODIMENTS

Figure 1:
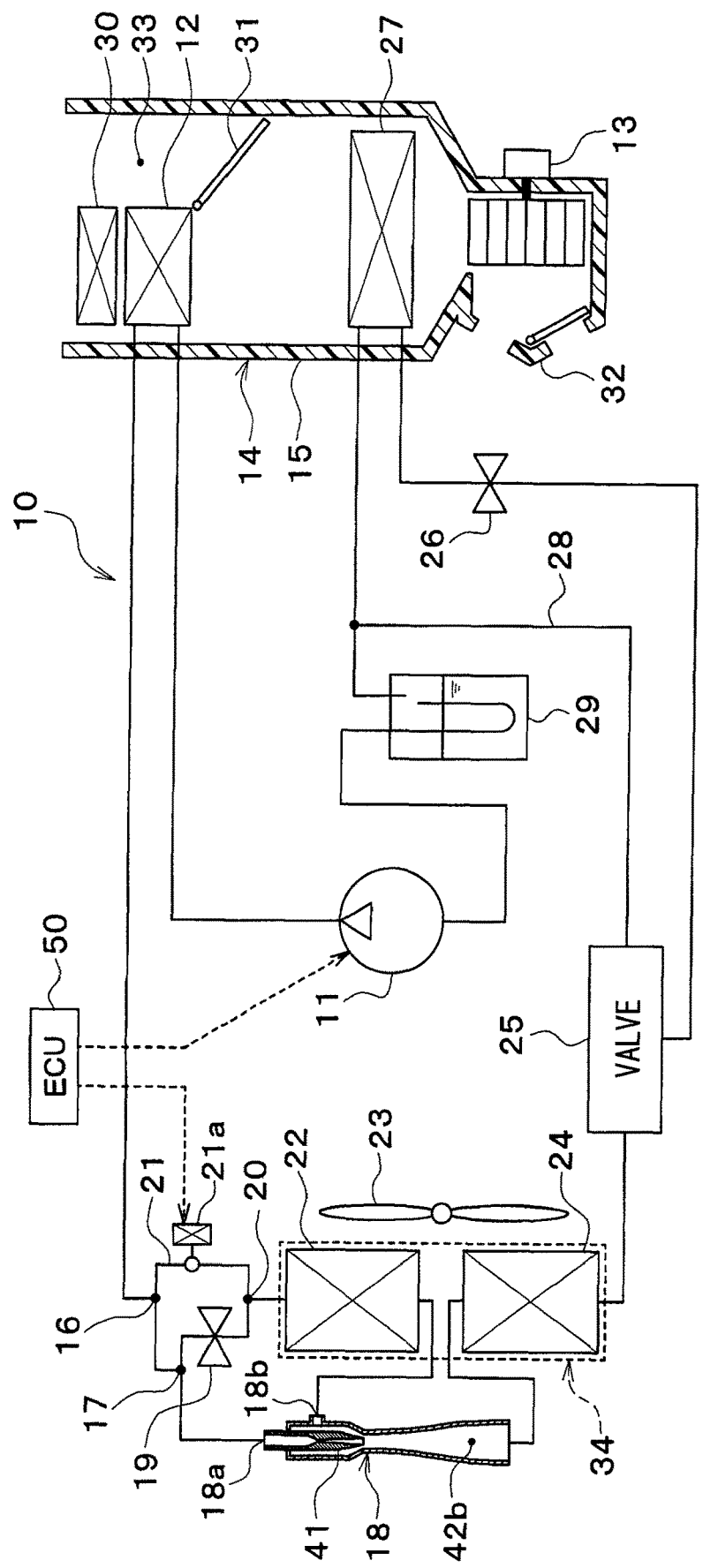
FIG. 1 is an entire configuration diagram of an ejector refrigeration cycle device in a first embodiment.

Hereinafter, embodiments will be described with reference to the accompanying drawings. In the respective embodiments below, the same or equivalent parts are indicated by the same reference characters throughout the drawings.

First Embodiment

An ejector refrigeration cycle device 10 shown in FIG. 1 is used in a vehicle air conditioner. The vehicle air conditioner is an air conditioner that performs air-conditioning of an interior of a vehicle cabin as a space to be air-conditioned. The ejector refrigeration cycle device 10 controls the temperature of air blown into the vehicle cabin by cooling or heating the air to be blown into the vehicle cabin. The air to be blown into the vehicle cabin is a fluid to be temperature-controlled in the ejector refrigeration cycle device 10.

The refrigerant in the ejector refrigeration cycle device 10 is a hydrofluorocarbon (HFC)-based refrigerant (e.g., R134a). The ejector refrigeration cycle device 10 configures a subcritical refrigeration cycle. The subcritical refrigeration cycle is a refrigeration cycle in which a high-pressure side refrigerant pressure does not exceed the critical pressure of the refrigerant. The refrigerant in the ejector refrigeration cycle device 10 may be a hydrofluoroolefin (HFO)-based refrigerant (e.g., R1234yf) or the like.

Refrigerant oil for lubricating a compressor 11 is mixed into the refrigerant, and part of the refrigerant oil circulates through the cycle together with the refrigerant.

In the ejector refrigeration cycle device 10, the compressor 11 draws and pressurizes the refrigerant to a high-pressure refrigerant, and then discharges the pressurized refrigerant. Specifically, the compressor 11 is an electric compressor, and accommodates, in a housing of the compressor 11, a fixed displacement compression mechanism and an electric motor for driving the compression mechanism.

Examples of the compression mechanism of the compressor 11 include various types of compression mechanisms, such as a scroll compression mechanism, and a vane compression mechanism. The electric motor of the compressor 11 has its operation (specifically, the rotational speed) controlled by a control signal output from a controller 50. The electric motor of the compressor 11 is an AC motor or a DC motor.

The compressor 11 may be an engine-driven compressor. The engine-driven compressor is driven by a rotational driving force transmitted from the vehicle traveling engine via a pulley, a belt, etc. For example, the engine-driven compressor is a variable displacement compressor, a fixed displacement compressor, or the like. The variable displacement compressor is a compressor capable of adjusting a refrigerant discharge capability by changing its discharge capacity. The fixed displacement compressor is a compressor that adjusts a refrigerant discharge capability by changing an operating rate of the compressor through the connection or disconnection of an electromagnetic clutch.

A radiator 12 is connected to a discharge port side of the compressor 11. The radiator 12 is a heat-dissipation heat exchanger that cools a high-pressure refrigerant discharged from the compressor 11 by dissipating heat from the high-pressure refrigerant through heat exchange between the high-pressure refrigerant and air blown by a blower 13. The blower 13 blows the air into the vehicle cabin. Specifically, the radiator 12 and the blower 13 are disposed in a casing 15 of an interior air-conditioning unit 14.

The refrigerant outlet side of the radiator 12 is connected to a refrigerant inflow port of a first branch portion 16. The first branch portion 16 causes the flow of the refrigerant flowing out of the radiator 12 to branch off therefrom. The first branch portion 16 is configured of a three-way joint with three inflow/outflow ports, one of which serves as a refrigerant inflow port, and the remaining two of which serve as refrigerant outflow ports. Such a three-way joint may be formed by jointing pipes with different diameters, or by providing a plurality of refrigerant passages in a metal or resin block.

One of the refrigerant outflow ports of the first branch portion 16 is connected to a refrigerant inflow port of a second branch portion 17. The second branch portion 17 causes the flow of the refrigerant flowing out of one refrigerant outflow port of the first branch portion 16 to branch off therefrom. The second branch portion 17 is configured of a three-way joint with three inflow/outflow ports, one of which serves as a refrigerant inflow port, and the remaining two of which serve as refrigerant outflow ports. Such a three-way joint may be formed by jointing pipes with different diameters, or by providing a plurality of refrigerant passages in a metal or resin block.

One of the refrigerant outflow ports of the second branch portion 17 is connected to a refrigerant inflow port 18a of an ejector 18. The other refrigerant outflow port of the second branch portion 17 is connected to one of refrigerant inflow ports of a merging portion 20 via a high-pressure side fixed throttle 19.

The high-pressure side fixed throttle 19 is a first decompressor that decompresses a liquid-phase refrigerant flowing out of the radiator 12. Specifically, the high-pressure side fixed throttle 19 is an orifice, a capillary tube, a nozzle, or the like.

Like the first branch portion 16, the merging portion 20 is configured of the three-way joint with three inflow/outflow ports, two of which serve as refrigerant inflow ports, and the remaining one of which serves as a refrigerant outflow port. Such a three-way joint may be formed by joining pipes with different diameters, or by providing a plurality of refrigerant passages in a metal or resin block.

The other refrigerant outflow port of the first branch portion 16 is connected to the other refrigerant inflow port of the merging portion 20 via a first bypass passage 21. A first on/off valve 21a is disposed in the first bypass passage 21. The first bypass passage 21 is a first bypass portion through which the refrigerant heat-exchanged in the radiator 12 flows to a first exterior heat exchanger 22 while bypassing the high-pressure side fixed throttle 19 and a nozzle portion 41 of the ejector 18.

The first on/off valve 21a is an opening/closing portion that opens or closes the first bypass passage 21. The first on/off valve 21a is a solenoid valve. The operation of the first on/off valve 21a is controlled by a control signal output from the controller 50.

The refrigerant outflow port of the merging portion 20 is connected to a refrigerant suction port 18b of the ejector 18 via the first exterior heat exchanger 22.

The first exterior heat exchanger 22 is a heat exchanger that exchanges heat between the high-pressure refrigerant discharged from the compressor 11 and air outside the vehicle cabin (hereinafter referred to as outside air) blown by an exterior blower 23. The first exterior heat exchanger 22 is disposed at the front side of the vehicle in an engine room. The exterior blower 23 is an electric blower that has the rotational speed (in other words, blowing volume) controlled by a control voltage output from the controller 50.

The ejector 18 functions as a decompressor that decompresses the high-pressure refrigerant flowing out of the radiator 12. The ejector 18 also functions as a refrigerant circulation portion (in other words, a refrigerant transport portion) that draws and transports a refrigerant by a suction effect of an injection refrigerant injected from the nozzle portion 41 at a high speed, and then circulates the drawn refrigerant in the cycle.

Figure 2:
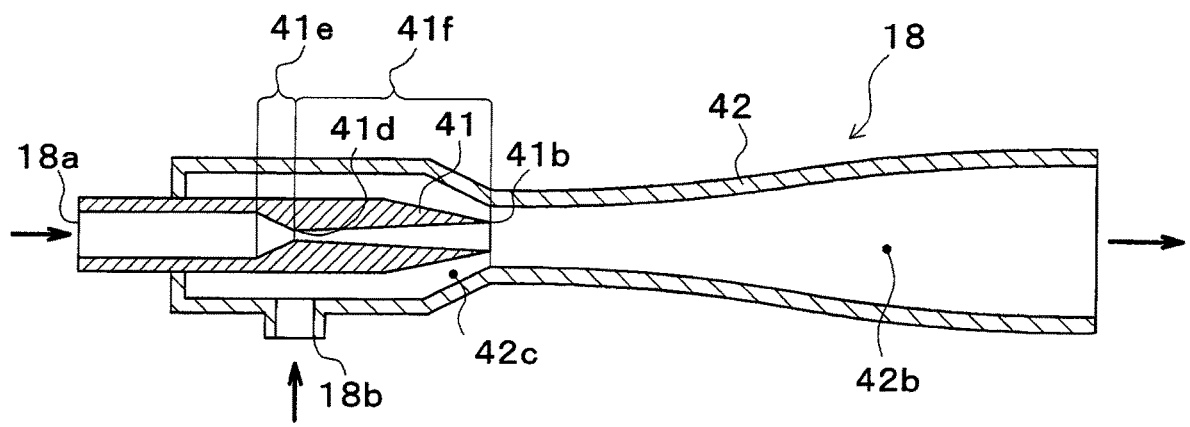
FIG. 2 is a cross-sectional view of an ejector in the first embodiment.

As shown in FIG. 2, the ejector 18 includes the nozzle portion 41 and a body portion 42. The nozzle portion 41 is formed of metal (e.g., a stainless alloy) having a substantially cylindrical shape that gradually tapers toward the flow direction of the refrigerant. The nozzle portion 41 isentropically decompresses the refrigerant flowing thereinto from the refrigerant inflow port 18a and then injects the refrigerant from a refrigerant injection port 41b provided on the most downstream side of the refrigerant flow.

A refrigerant passage that decompresses the refrigerant flowing from the refrigerant inflow port 18a is defined within the nozzle portion 41.

The refrigerant passage within the nozzle portion 41 has a minimum passage area portion 41d, a convergent portion 41e, and a divergent portion 41f formed therein. In the minimum passage area portion 41d, the refrigerant passage area is at minimum. In the convergent portion 41e, the refrigerant passage area is gradually reduced toward the minimum passage area portion 41d. In the divergent portion 41f, the refrigerant passage area is gradually enlarged from the minimum passage area portion 41d toward the refrigerant injection port 41b.

The convergent portion 41e is formed in a truncated cone shape that gradually reduces the refrigerant passage area toward the minimum passage area portion 41d. The divergent portion 41f is arranged coaxially with the convergent portion 41e, and formed in a truncated cone shape that gradually enlarges the refrigerant passage area from the minimum passage area portion 41d toward the refrigerant injection port 41b.

The body portion 42 is formed of metal (e.g., aluminum) in a substantially cylindrical shape to configure an outer shell of the ejector 18. The body portion 42 functions as a fixing member that supports and fixes the nozzle portion 41 therein. The nozzle portion 41 is fixed to the body portion 42 by press-fitting or the like so as to be accommodated inside a part on one end side in the longitudinal direction of the body portion 42.

The refrigerant suction port 18b is formed in a part of an outer peripheral side surface of the body portion 42 that corresponds to the outer peripheral side of the nozzle portion 41. The refrigerant suction port 18b is provided to penetrate the body portion 42 therethrough and to communicate with the refrigerant injection port 41b of the nozzle portion 41. The refrigerant suction port 18b is a through hole that draws the refrigerant flowing out of the first exterior heat exchanger 22 into the interior of the ejector 18 by the suction effect of the injection refrigerant injected from the refrigerant injection port 41b of the nozzle portion 41.

An inlet space for causing the refrigerant to flow thereinto is formed around the refrigerant suction port 18b inside the body portion 42. A suction passage 42c is defined between an inner peripheral wall surface of the body portion 42 and an outer peripheral wall surface of the tip end part and its surrounding of the tapered shape of the nozzle portion 41. The suction passage 42c guides the suction refrigerant flowing into the body portion 42 to a diffuser 42b.

The suction passage 42c gradually reduces its refrigerant passage area toward the flow direction of the refrigerant. Thus, the ejector 18 of the present embodiment gradually increases the flow speed of the suction refrigerant passing through the suction passage 42c, thereby reducing an energy loss (in other words, mixing loss) when mixing the suction refrigerant and the injection refrigerant in the diffuser 42b.

The diffuser 42b is disposed to continuously lead to an outlet side of the suction passage 42c and formed in such a manner as to gradually increase its refrigerant passage area. Thus, the diffuser 42b exerts the function of converting the kinetic energy of the mixed refrigerant composed of the injection refrigerant and suction refrigerant into pressure energy. That is, the diffuser 42b functions as a pressurizing portion that pressurizes the mixed refrigerant by decreasing the flow speed of the mixed refrigerant.

The shape of the inner peripheral wall surface of the body portion 42 forming the diffuser 42b is defined by a combination of a plurality of curved lines. The expansion of the refrigerant passage cross-sectional area of the diffuser 42b gradually increases toward the flow direction of the refrigerant and then decreases again, thereby making it possible to isentropically pressurize the refrigerant.

As shown in FIG. 1, the refrigerant outlet side of the ejector 18 is connected to a refrigerant inflow port of a three-way valve 25 via a second exterior heat exchanger 24.

The second exterior heat exchanger 24 is a heat exchanger that exchanges heat between the high-pressure refrigerant flowing out of the ejector 18 and the outside air blown by the exterior blower 23. The second exterior heat exchanger 24 is disposed at the front side of the vehicle inside the engine room.

The three-way valve 25 switches between a refrigerant circuit in which the refrigerant heat-exchanged by the second exterior heat exchanger 24 flows out to the side of the refrigerant inflow port of a low-pressure side fixed throttle 26 and a refrigerant circuit in which the refrigerant heat-exchanged by the second exterior heat exchanger 24 flows out to the side of a second bypass passage 28.

The second bypass passage 28 is a second bypass portion through which the refrigerant heat-exchanged in the second exterior heat exchanger 24 flows while bypassing the low-pressure side fixed throttle 26 and an evaporator 27.

The three-way valve 25 is a solenoid valve that opens or closes the refrigerant passage on the side of the low-pressure side fixed throttle 26 and the second bypass passage 28. The operation of the three-way valve 25 is controlled by a control signal output from the controller 50.

One of the refrigerant outflow ports of the three-way valve 25 is connected to the refrigerant inlet side of the evaporator 27 via the low-pressure side fixed throttle 26. The refrigerant outlet side of the evaporator 27 is connected to a refrigerant inflow port of a gas-liquid separator 29.

The other refrigerant outflow port of the three-way valve 25 is connected to the refrigerant inlet side of the second bypass passage 28. The refrigerant outlet side of the second bypass passage 28 is connected to a refrigerant inflow port of the gas-liquid separator 29.

The gas-liquid separator 29 is a gas-liquid separating portion that separates the refrigerant flowing therein into a gas-phase refrigerant and a liquid-phase refrigerant. The gas-liquid separator 29 has the function of a liquid storage portion that stores the separated liquid-phase refrigerant as an excess liquid-phase refrigerant in the cycle. The gas-phase refrigerant outflow port of the gas-liquid separator 29 is connected to the suction side of the compressor 11.

A low-pressure side fixed throttle 26 is a second decompressor that decompresses a liquid-phase refrigerant flowing out of the second exterior heat exchanger 24. Specifically, the low-pressure side fixed throttle 26 is an orifice, a capillary tube, a nozzle, or the like.

The evaporator 27 is a heat-absorption heat exchanger that exchanges heat between the low-pressure refrigerant decompressed in the low-pressure side fixed throttle 26 and the air to be blown from the blower 13 into the vehicle cabin, thereby evaporating the low-pressure refrigerant to exhibit the heat absorption effect.

The blower 13 is an electric blower that has its rotational speed (in other words, blowing volume) controlled by a control voltage output from the controller 50. The evaporator 27 is disposed in the casing 15 of the interior air-conditioning unit 14.

The interior air-conditioning unit 14 is a unit that blows out the air temperature-controlled by the ejector refrigeration cycle device 10, into the vehicle cabin. The interior air-conditioning unit 14 is disposed inside a dashboard at the foremost part of the interior of the vehicle cabin.

The outer shell of the interior air-conditioning unit 14 is formed of the casing 15. The casing 15 accommodates therein the blower 13, the evaporator 27, a radiator 12, an auxiliary heater 30, an air mix door 31, and the like.

The casing 15 defines an air passage for the air to be blown into the vehicle cabin. The casing 15 is formed of resin (for example, polypropylene) with some elasticity and excellent strength.

An inside/outside air switching device 32 is disposed at the most upstream side of the air flow in the casing 15. The inside/outside air switching device 32 is an inside/outside air switching portion that switches between the air in the vehicle cabin (hereinafter referred to as the inside air) and the outside air to introduce the switched air into the casing 15.

The inside/outside air switching device 32 includes an inside air introduction port, an outside air introduction port, and an inside/outside air switching door. The inside air introduction port introduces the inside air into the casing 15. The outside air introduction port introduces the outside air into the casing 15. The inside/outside air switching door continuously adjusts the opening areas of the inside air introduction port and the outside air introduction port, thereby continuously changing the ratio of the volume of the inside air to the volume of the outside air.

The inside/outside air switching door is driven by an electric actuator for the inside/outside air switching door. The electric actuator in the inside/outside air switching door has its operation controlled by a control signal output from the controller 50.

The blower 13 is disposed on the air-flow downstream side with respect to the inside/outside air switching device 32. The blower 13 is a blowing portion that blows the air drawn via the inside/outside air switching device 32, into the vehicle cabin. The blower 13 is an electric blower that includes a centrifugal multi-blade fan driven by an electric motor. The blower 13 has its rotational speed (in other words, blowing volume) controlled by a control voltage output from the controller 50.

The evaporator 27, the radiator 12, and the auxiliary heater 30 are disposed on the air-flow downstream side with respect to the blower 13 in this order relative to the air flow. The auxiliary heater 30 is an electric heater that generates heat by being supplied with power from the controller 50, and specifically, is a heating heat exchanger that heats the air having passed through the radiator 12. For example, the auxiliary heater 30 includes a PTC element, a nichrome wire, or the like.

A cold-air bypass passage 33 is defined in the casing 15. The cold-air bypass passage 33 is an air passage that causes the air having passed through the evaporator 27 to flow to the downstream side while bypassing the radiator 12 and the auxiliary heater 30. The air mix door 31 is disposed on the air-flow downstream side with respect to the evaporator 27 and on the air-flow upstream side with respect to the radiator 12 and the auxiliary heater 30.

The air mix door 31 is an air-volume-ratio adjustment portion that adjusts the ratio of the volume of the air passing through the radiator 12 and the auxiliary heater 30 to the volume of the air passing through the cold-air bypass passage 33 in the air after passing through the evaporator 27. The air mix door 31 is driven by an electric actuator for driving the air mix door. The electric actuator of the air mix door 31 has its operation controlled by a control signal output from the controller 50.

A mixing space for mixing air having passed through the auxiliary heater 30 with air having passed through the cold-air bypass passage 33 is provided on the air-flow downstream side with respect to the auxiliary heater 30 and the cold-air bypass passage 33. Thus, the air mix door 31 adjusts the air volume ratio, thereby controlling the temperature of the air mixed in the mixing space.

In the most downstream part of the air flow in the casing 15, openings (not shown) are provided for blowing the conditioned air mixed in the mixing space, into the vehicle cabin as a space to be air-conditioned. Specifically, the openings include a face opening, a foot opening, and a defroster opening. The face opening blows out the conditioned air toward the upper body of an occupant in the vehicle cabin. The foot opening blows out the conditioned air toward the feet of the occupant. The defroster opening blows out the conditioned air toward the inner side surface of a windshield of the vehicle.

A face air outlet, a foot air outlet, and a defroster air outlet (all not shown) provided in the vehicle cabin are connected to the air-flow downstream sides with respect to the face opening, the foot opening, and the defroster opening, respectively, via ducts (not shown).

A face door for adjusting an opening area of the face opening, a foot door for adjusting an opening area of the foot opening, and a defroster door for adjusting an opening area of the defroster opening (all doors not shown) are disposed on the air-flow upstream sides with respect to the face opening, the foot opening, and the defroster opening, respectively.

The face door, the foot door, and the defroster door are air outlet mode switching portions that switch air outlet modes. The face door, the foot door, and the defroster door are coupled to electric actuators for driving the air outlet mode doors via link mechanisms or the like, and are rotationally operated in conjunction with the electric actuators. The electric actuators for driving the air outlet mode doors have their respective operations controlled by control signals output from the controller 50.

The controller 50 is configured of a well-known microcomputer, including a CPU, a ROM, a RAM, and the like, and peripheral circuits thereof. The controller 50 controls the operations of various control target devices by performing various computations and processing based on control programs stored in the ROM.

An air-conditioning control sensor group is connected to the controller 50. The sensor group includes an inside-air temperature sensor, an outside-air temperature sensor, a solar radiation sensor, an evaporator temperature sensor, an outlet-side temperature sensor, and an outlet-side pressure sensor, and the like. Detected values of the sensor group are input to the controller 50.

The inside-air temperature sensor detects the temperature of an interior of the vehicle cabin. The outside-air temperature sensor detects the outside air temperature. The solar radiation sensor detects a solar radiation amount in the interior of the vehicle cabin. The evaporator temperature sensor detects a blown air temperature of the evaporator 27 (i.e., the temperature of the evaporator). The outlet-side temperature sensor detects the temperature of the refrigerant on the outlet side of the radiator 12. The outlet-side pressure sensor detects the pressure of the refrigerant on the outlet side of the radiator 12.

An operation panel (not shown) disposed near the dashboard at the front of the interior of the vehicle cabin is connected to the input side of the controller 50. Operation signals from various operation switches provided on the operation panel are input to the controller 50.

Various operation switches include an air conditioning operation switch, a vehicle interior temperature setting switch, and the like. The air conditioning operation switch is a switch for requiring air-conditioning of the interior of the vehicle cabin. The vehicle interior temperature setting switch is a switch for setting the temperature of the interior of the vehicle cabin.

The controller 50 incorporates therein control units for controlling the operations of various control target devices connected to its output side. A structure (specifically, hardware and software) of the controller 50 that controls the operation of each of the control target devices configures the control unit for each control target device. For example, the structure for controlling the operation of the compressor 11 configures a discharge capacity control unit. For example, the structure for controlling the operation of the first on/off valve 21*a* configures an opening/closing control unit.

The first exterior heat exchanger 22, the second exterior heat exchanger 24, and the ejector 18 configure an exterior heat exchanger unit 34.

Figure 3:
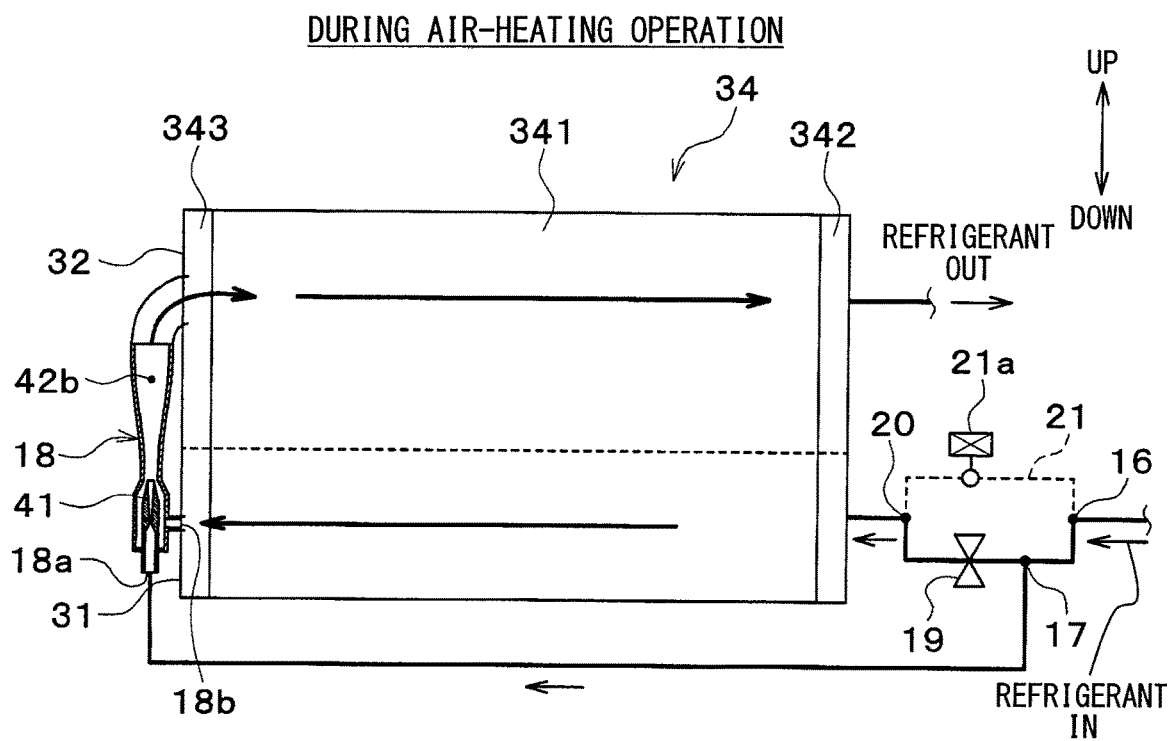
FIG. 3 is a schematic diagram of an exterior heat exchanger unit in the first embodiment, showing the flow state of a refrigerant during an air-heating operation.

As shown in FIG. 3, the exterior heat exchanger unit 34 is a cross-flow heat exchanger in which the refrigerant as an internal fluid flows in a horizontal direction. The up and down arrows in FIG. 3 indicate the upward and downward directions of the vehicle.

The exterior heat exchanger unit 34 includes a core portion 341 and tank portions 342 and 343. The core portion 341 is a substantially rectangular heat exchanging portion including tubes (not shown) and fins (not shown). The tubes are pipes through which the refrigerant flows.

A plurality of tubes is arranged in parallel with each other. The plurality of tubes is arranged such that the longitudinal direction of the tubes coincides with the horizontal direction. The plurality of tubes is arranged side by side in the up and down direction.

The fin is a heat transfer member formed in a wave shape and joined to each tube. The heat transfer area with respect to the air is increased by the fins, thereby promoting the heat exchange between the refrigerant and the air.

The tank portions 342 and 343 extend in the direction perpendicular to the longitudinal direction of the tubes (in the up and down direction in the present embodiment) to communicate with the plurality of tubes at their ends in the longitudinal direction of the tubes (the ends in the right and left direction in the present embodiment). The tank portions 342 and 343 distribute and collect the refrigerant to and from the plurality of tubes.

A partition is provided in the tank portions 342 and 343 such that the refrigerant flow direction in the core portion 341 makes one U-turn. Specifically, the partition is provided between a part configuring the first exterior heat exchanger 22 and a part configuring the second exterior heat exchanger 24 in the tank portions 342 and 343. Thus, in the core portion 341, a part configuring the first exterior heat exchanger 22 and a part configuring the second exterior heat exchanger 24 have opposite flow directions of the refrigerant.

The ejector 18 is disposed on the side of the core portion 341. The ejector 18 is disposed such that the axial direction of the nozzle portion 41 is parallel to the longitudinal direction of each of the tank portions 342 and 343. The ejector 18 is fixed to the outer surfaces of the tank portions 342 and 343.

For example, the ejector 18 and the exterior heat exchanger unit 34 are formed of an aluminum alloy and joined to each other by brazing.

The refrigerant suction port 18b of the ejector 18 is connected to the tank portions 342 and 343 of the first exterior heat exchanger 22. The refrigerant outlet of the ejector 18 is connected to the tank portions 342 and 343 of the second exterior heat exchanger 24.

Next, the operation of the present embodiment with the above-mentioned configuration will be described with reference to FIGS. 4 to 8. When the air conditioning operation switch on the operation panel is turned on, the controller 50 operates the compressor 11, the blower 13, the exterior blower 23, and the like. Thus, the compressor 11 draws, compresses, and discharges the refrigerant.

The controller 50 determines the operation mode of the ejector refrigeration cycle device 10 to be any one of the air-heating operation, the defrosting operation, and the air-cooling operation. For example, the controller 50 determines the operation mode to be either the air-heating operation or the air-cooling operation based on a target air outlet temperature TAO. When frost is formed on the first exterior heat exchanger 22 and the second exterior heat exchanger 24 in the air-heating operation, the controller 50 determines the operation mode to be set to the defrosting operation.

The target air outlet temperature TAO is a value determined so that the inside air temperature quickly approaches a target temperature desired by the occupant and calculated by the following formula.

$$TAO = Kset \times Tset - Kr \times Tr - Kam \times Tam - Ks \times Ts + C$$

where Tset is a target temperature of the interior of the vehicle cabin, set by the vehicle interior temperature setting switch, Tr is the temperature of the interior of the vehicle cabin detected by the inside-air temperature sensor, Tam is an outside air temperature detected by the outside-air temperature sensor, and Ts is a solar radiation amount detected by the solar radiation sensor. Kset, Kr, Kam, and Ks are control gains, and C is a correction constant.

For example, the controller 50 determines the operation mode to be the air-cooling operation when the target air outlet temperature TAO is in a low temperature range, whereas the controller 50 determines the operation mode to be an air-heating operation when the target air outlet temperature TAO is in a high temperature range.

In the air-heating operation, the controller 50 performs control such that the first on/off valve 21a is closed and that the three-way valve 25 closes the refrigerant passage on the side of the low-pressure side fixed throttle 26 and opens the second bypass passage 28. In the air-heating operation, the controller 50 also performs control such that the air mix door 31 opens an air passage on the side of the radiator 12, and closes the cold-air bypass passage 33.

Figure 4:
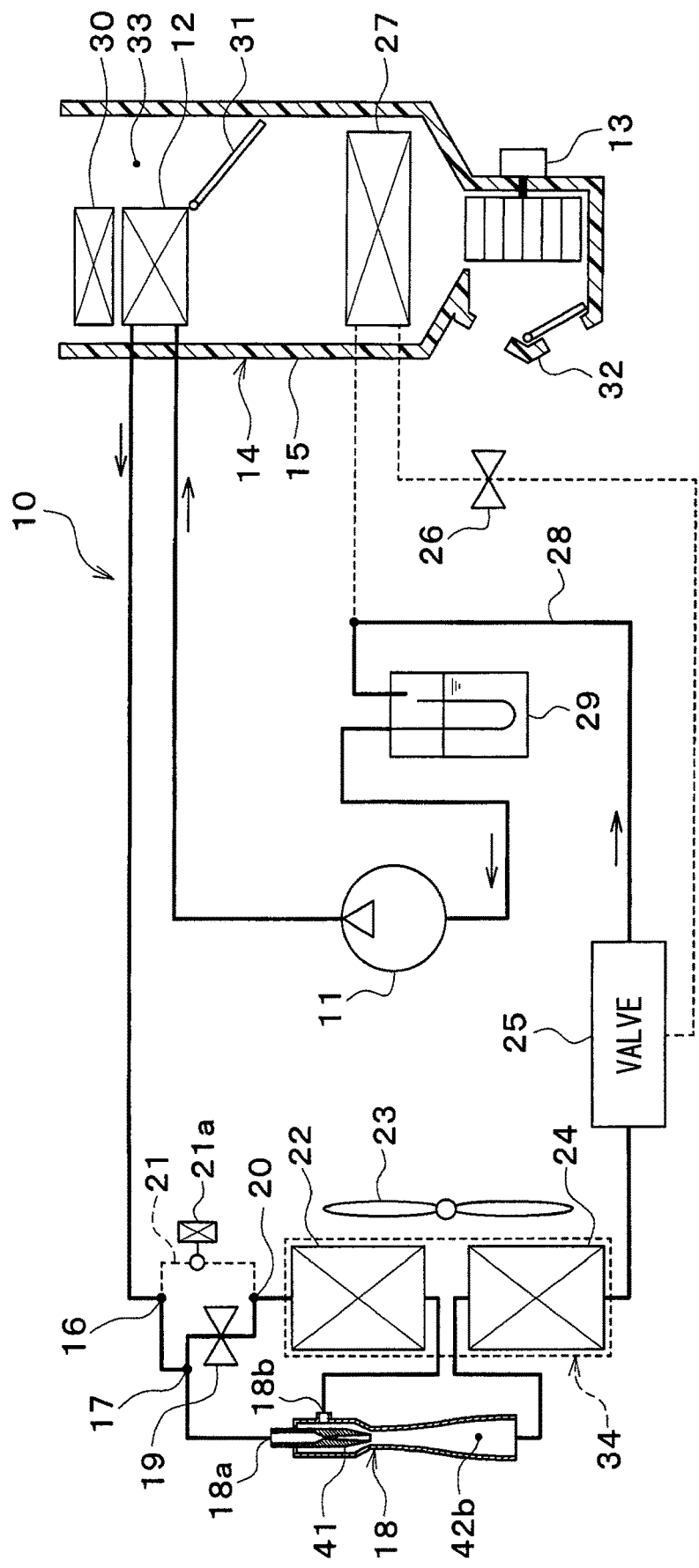
FIG. 4 is an entire configuration diagram of the ejector refrigeration cycle device in the first embodiment, showing the flow state of the refrigerant during the air-heating operation.
Figure 5:
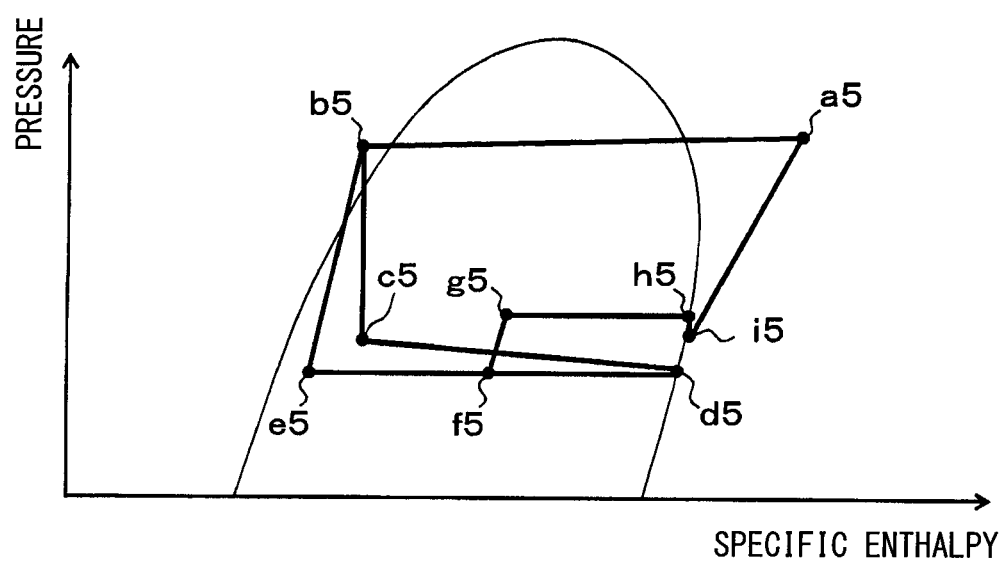
FIG. 5 is a Mollier diagram showing the state of the refrigerant during the air-heating operation of the ejector refrigeration cycle device in the first embodiment.

Thus, as shown in FIGS. 4 and 5, in the air-heating operation, the high-temperature and high-pressure refrigerant discharged from the compressor 11 flows into the radiator 12 (at point a5 in FIG. 5) and exchanges heat with the air blown from the blower 13, thereby dissipating heat to be condensed (as indicated from point a5 to point b5 in FIG. 5).

The refrigerant that has dissipated heat in the radiator 12 flows from the first branch portion 16 to the second branch portion 17, and then branches off from the second branch portion 17 to the side of the high-pressure side fixed throttle 19 and the side of the nozzle portion 41 of the ejector 18. One refrigerant that has branched to the side of the high-pressure side fixed throttle 19 in the second branch portion 17 flows into the high-pressure side fixed throttle 19 and is isenthalpically decompressed (as indicated from point b5 to point c5 in FIG. 5).

The refrigerant decompressed in the high-pressure side fixed throttle 19 flows into the first exterior heat exchanger 22 and absorbs heat from the outside air blown from the exterior blower 23 to evaporate (as indicated from point c5 to point d5 in FIG. 5).

Meanwhile, the refrigerant that has branched to the side of the nozzle portion 41 of the ejector 18 in the second branch portion 17 flows into the refrigerant inflow port 18a of the nozzle portion 41 in the ejector 18 and is isentropically decompressed to be injected from the refrigerant injection port 41b (as indicated from point b5 to point e5 in FIG. 5).

The refrigerant flowing out of the first exterior heat exchanger 22 is drawn from the refrigerant suction port 18b by the suction effect of the refrigerant injected from the refrigerant injection port 41b. The refrigerant injected from the refrigerant injection port 41b and the refrigerant drawn from the refrigerant suction port 18b flow into the diffuser 42b (as indicated from point e5 to point f5 and from point d5 to point f5 in FIG. 5).

The diffuser 42b converts the kinetic energy of the mixed refrigerant into pressure energy thereof by enlarging the refrigerant passage area. Consequently, the pressure of the mixed refrigerant is increased while mixing the refrigerant injected from the refrigerant injection port 41b and the refrigerant drawn from the refrigerant suction port 18b (as indicated from point f5 to point g5 in FIG. 5). The refrigerant flowing out of the diffuser 42b flows into the second exterior heat exchanger 24 and absorbs heat from the outside air blown from the exterior blower 23 to evaporate (as indicated from the point g5 to a point h5 in FIG. 5).

The refrigerant flowing out of the second exterior heat exchanger 24 flows into the gas-liquid separator 29 to be separated into a gas-phase refrigerant and a liquid-phase refrigerant (as indicated from point h5 to point i5 in FIG. 5).

The gas-phase refrigerant separated by the gas-liquid separator 29 is drawn from the suction port of the compressor 11 and compressed again in the compressor 11 (as indicated from point i5 to point a5 in FIG. 5). The reason why the point h5 differs from the point i5 in FIG. 5 is that the gas-phase refrigerant flowing out of the gas-liquid separator 29 experiences a pressure loss when circulating through a refrigerant pipe leading from the gas-phase refrigerant outflow port of the gas-liquid separator 29 to the suction port of the compressor 11. Therefore, in the ideal cycle, the point h5 desirably coincides with the point i5.

The ejector refrigeration cycle device 10 operates in the air-heating operation in the way described above, and thereby can heat the air to be blown into the vehicle cabin.

In the ejector refrigeration cycle device 10, the refrigerant pressurized by the diffuser 42*b* of the ejector 18 is drawn into the compressor 11 during the air-heating operation, so that the driving power of the compressor 11 is reduced, thereby making it possible to improve the coefficient of performance (so-called COP) of the cycle.

Since the refrigerant pressure of the first exterior heat exchanger 22 can be reduced by an increase in the pressure of the refrigerant, pressurized by the ejector 18, the heat absorption capacity of the first exterior heat exchanger 22 can be improved, and the air heating capacity thereof can also be improved.

In the defrosting operation, the controller 50 performs controls such that the first on/off valve 21*a* is opened and that the three-way valve 25 closes the refrigerant passage on the side of the low-pressure side fixed throttle 26 and opens the second bypass passage 28. In the defrosting operation, the controller 50 also performs control such that the air mix door 31 closes an air passage on the side of the radiator 12 and opens the cold-air bypass passage 33.

Figure 6:
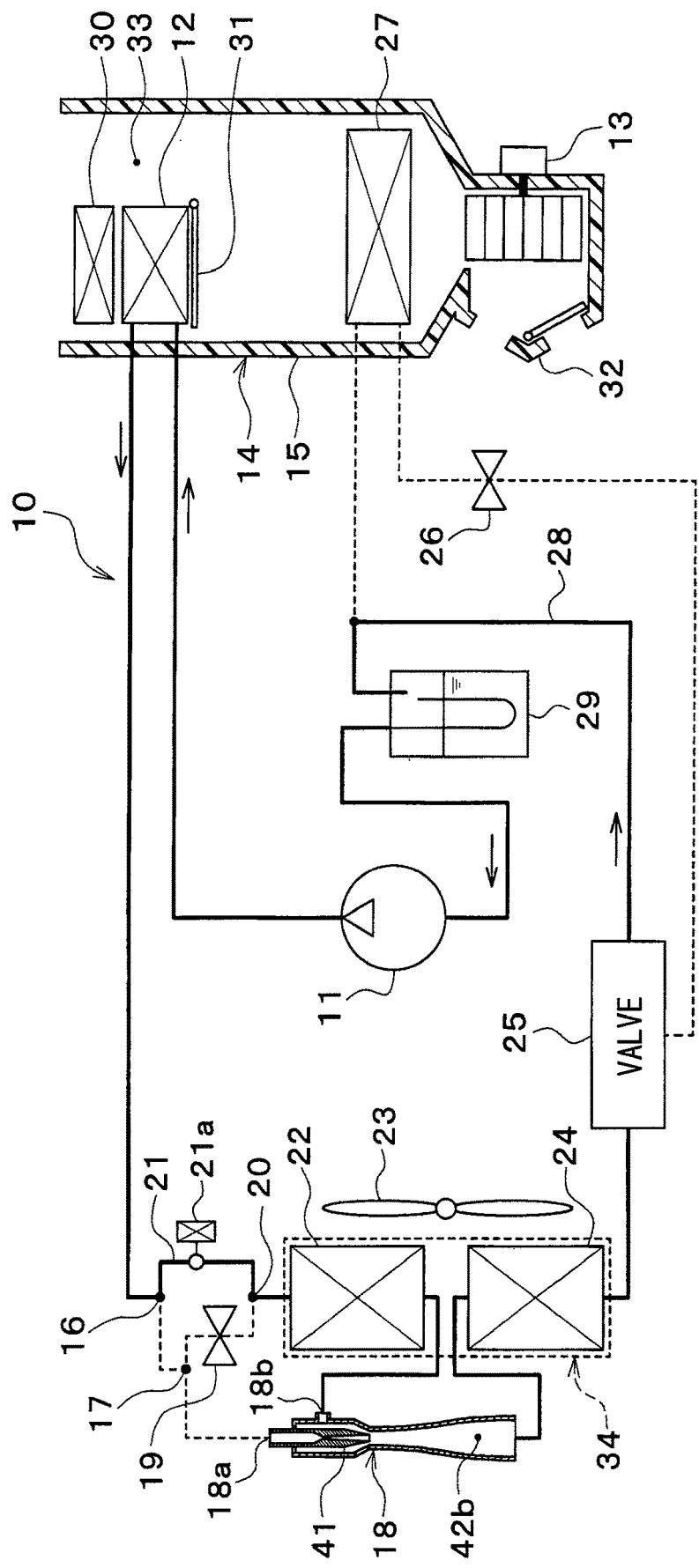
FIG. 6 is an entire configuration diagram of the ejector refrigeration cycle device in the first embodiment, showing the flow state of the refrigerant during a defrosting operation.

Thus, as shown in FIG. 6, in the defrosting operation, the high-temperature and high-pressure refrigerant discharged from the compressor 11 flows into the radiator 12 and then flows out of the radiator 12 without any heat exchange. This is because the air blown from the blower 13 passes through the cold-air bypass passage 33 without passing through the radiator 12.

Figure 7:
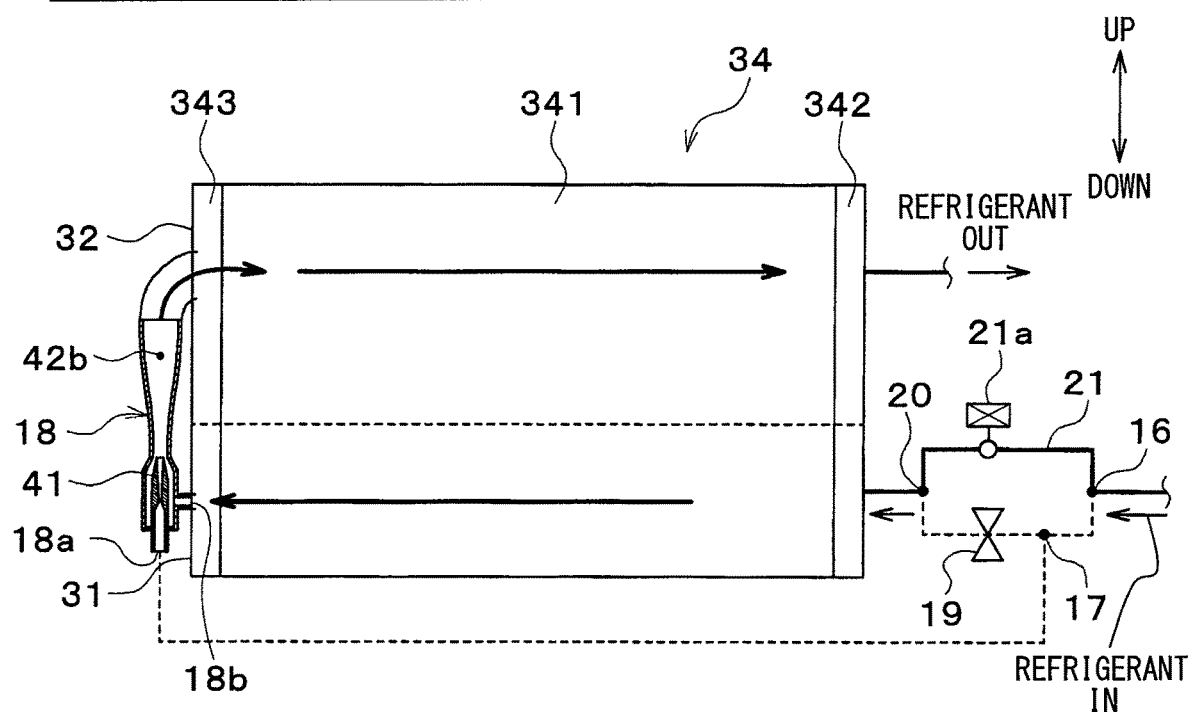
FIG. 7 is a schematic diagram of the exterior heat exchanger unit in the first embodiment, showing the flow state of the refrigerant during the defrosting operation and an air-cooling operation.

As shown in FIGS. 6 and 7, the refrigerant flowing out of the radiator 12 flows through a path that has a small passage resistance, from the first branch portion 16 to the first bypass passage 21 and the merging portion 20 in this order, and eventually flows into the first exterior heat exchanger 22. The refrigerant flowing into the first exterior heat exchanger 22 is condensed by dissipating heat therefrom through heat exchange with the outside air blown from the exterior blower 23.

The refrigerant that dissipates heat in the first exterior heat exchanger 22 flows into the refrigerant suction port 18*b* of the ejector 18 and then flows out of the diffuser 42*b*. Since the refrigerant does not flow into the nozzle portion 41 of the ejector 18, the ejector 18 simply functions as a refrigerant flow passage without functioning as a decompressor or a refrigerant circulation portion.

The refrigerant flowing out of the diffuser 42*b* flows into the second exterior heat exchanger 24 and is condensed by dissipating heat therefrom through heat exchange with the outside air blown from the exterior blower 23.

As shown in FIG. 6, the refrigerant that has dissipated heat in the second exterior heat exchanger 24 flows into the gas-liquid separator 29 to be separated into a gas-phase refrigerant and a liquid-phase refrigerant. The gas-phase refrigerant separated by the gas-liquid separator 29 is drawn from the suction port of the compressor 11 and compressed again in the compressor 11.

The ejector refrigeration cycle device 10 operates in the defrosting operation in the way described above, thereby causing the high-temperature refrigerant to flow through the first exterior heat exchanger 22 and the second exterior heat exchanger 24. Consequently, frost formed on the first exterior heat exchanger 22 and the second exterior heat exchanger 24 is melted, thereby enabling defrosting.

In the air-cooling operation, the controller 50 performs control such that the first on/off valve 21*a* is opened and the three-way valve 25 opens the refrigerant passage on the side of the low-pressure side fixed throttle 26 and closes the second bypass passage 28. In the air-cooling operation, the controller 50 also controls the air mix door 31 to a predetermined opening degree.

Figure 8:
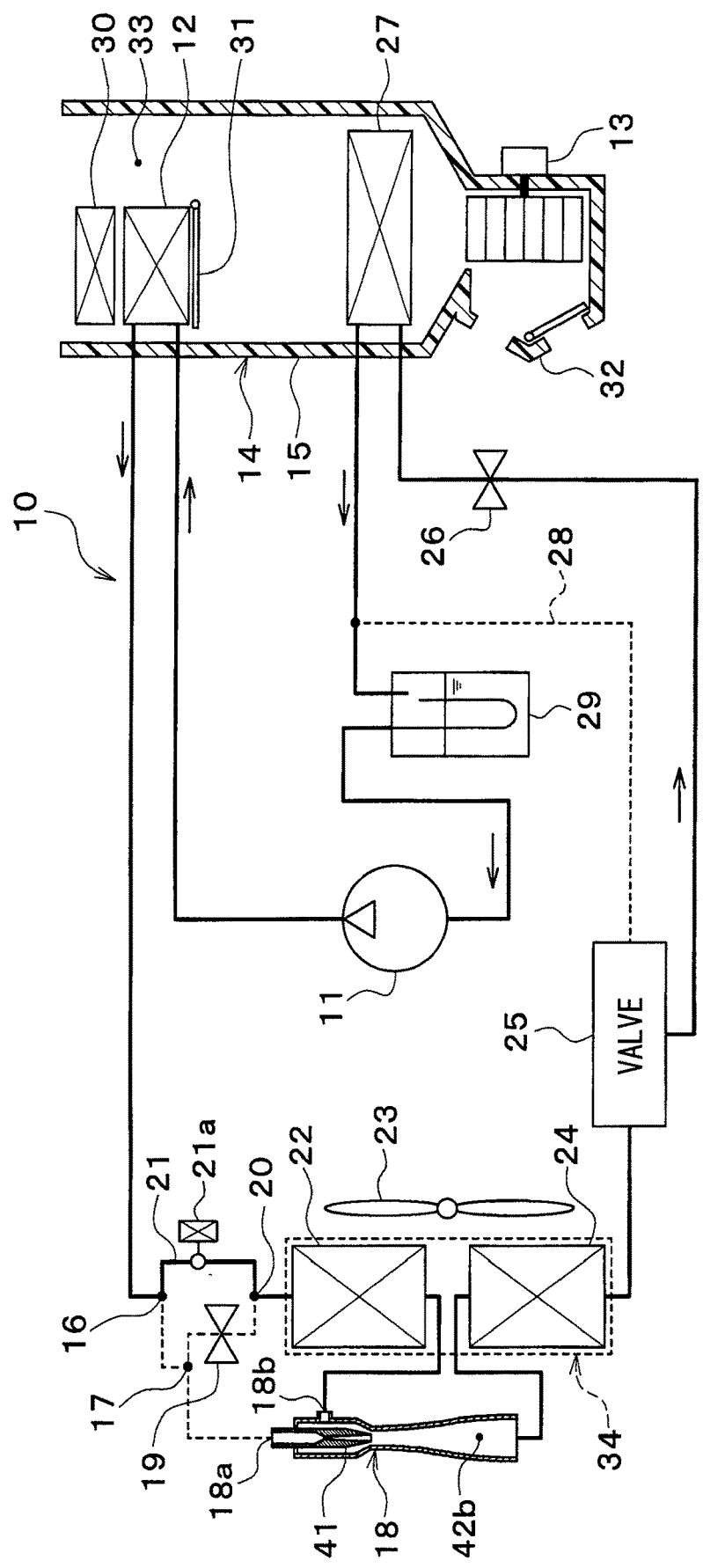
FIG. 8 is an entire configuration diagram of the ejector refrigeration cycle device in the first embodiment, showing the flow state of the refrigerant during the air-cooling operation.

Thus, as shown in FIG. 8, in the air-cooling operation, the high-temperature and high-pressure refrigerant discharged from the compressor 11 flows into the radiator 12. When the air mix door 31 closes an air passage on the side of the radiator 12, the refrigerant flowing into the radiator 12 flows out of the radiator 12 without exchanging any heat. When the air mix door 31 opens an air passage on the side of the radiator 12, the refrigerant flowing into the radiator 12 is condensed by dissipating heat therefrom through heat exchange with the air blown from the blower 13.

As shown in FIGS. 7 and 8, the refrigerant flowing out of the radiator 12 flows through a path that has a small passage resistance, from the first branch portion 16 to the first bypass passage 21 and the merging portion 20 in this order, and eventually flows into the first exterior heat exchanger 22. The refrigerant flowing into the first exterior heat exchanger 22 is condensed by dissipating heat therefrom through heat exchange with the outside air blown from the exterior blower 23.

The refrigerant that has dissipated heat in the first exterior heat exchanger 22 flows into the refrigerant suction port 18*b* of the ejector 18 and then flows out of the diffuser 42*b*. Since the refrigerant does not flow into the nozzle portion 41 of the ejector 18, the ejector 18 simply functions as a refrigerant flow passage without functioning as a decompressor or a refrigerant circulation portion.

The refrigerant flowing out of the diffuser 42*b* flows into the second exterior heat exchanger 24 and evaporates by absorbing heat from the outside air blown from the exterior blower 23.

As shown in FIG. 8, the refrigerant flowing out of the second exterior heat exchanger 24 is isenthalpically decompressed in the low-pressure side fixed throttle 26 to flow into the evaporator 27. The refrigerant flowing into the evaporator 27 evaporates by absorbing heat from the air blown from the blower 13. In this way, the air to be blown into the vehicle cabin is cooled.

The refrigerant flowing out of the evaporator 27 flows into the gas-liquid separator 29 to be separated into a gas phase refrigerant and a liquid phase refrigerant. The gas-phase refrigerant separated by the gas-liquid separator 29 is drawn from the suction port of the compressor 11 and compressed again in the compressor 11.

The ejector refrigeration cycle 10 operates in the air-cooling operation in the way described above, and thereby can cool the air to be blown into the vehicle cabin.

In the present embodiment, the compressor 11 draws, compresses, and discharges the refrigerant. The radiator 12 exchanges heat between the refrigerant compressed by the compressor 11 and the air to be blown into the vehicle cabin. The high-pressure side fixed throttle 19 decompresses the refrigerant heat-exchanged in the radiator 12. The first exterior heat exchanger 22 exchanges heat between the refrigerant decompressed in the high-pressure side fixed throttle 19 and the outside air.

The ejector 18 decompresses the refrigerant flowing out of the radiator 12 in the nozzle portion 41, and draws another refrigerant from the refrigerant suction port 18b by a suction effect of the injection refrigerant injected from the nozzle portion 41. The ejector 18 then mixes the injection refrigerant and the suction refrigerant drawn from the refrigerant suction port together and pressurizes the mixed refrigerant in the pressurizing portion 42b.

The second exterior heat exchanger 24 exchanges heat between the outside air and the refrigerant pressurized by the ejector 18. The second branch portion 17 causes the refrigerant heat-exchanged in the radiator 12 to branch to the side of the high-pressure side fixed throttle 19 and the side of the nozzle portion 41 of the ejector 18.

In the first bypass passage 21, the refrigerant heat-exchanged in the radiator 12 flows to the first exterior heat exchanger 22 while bypassing the high-pressure side fixed throttle 19 and the nozzle portion 41 of the ejector 18. The first on/off valve 21a opens or closes the first bypass passage 21.

Thus, when the first on/off valve 21a closes the first bypass passage 21, the refrigerant absorbs heat from the outside air in the first exterior heat exchanger 22 and the second exterior heat exchanger 24. Then, the refrigerant dissipates heat in the radiator 12 into the air to be blown into the space to be air-conditioned. In this way, the air-heating operation can be achieved.

When the first on/off valve 21a opens the first bypass passage 21, an operation of dissipating heat into the outside air in the first exterior heat exchanger 22 and the second exterior heat exchanger 24 (specifically, the defrosting operation and the air-cooling operation) can be achieved.

During the air-heating operation, the air heating capacity and the cycle efficiency can be improved by the pressurizing effect of the ejector 18.

That is, during the air-heating operation, the first exterior heat exchanger 22 can evaporate the refrigerant at an evaporation pressure that is lower than a suction pressure of the compressor by an amount corresponding to the pressurizing effect at the ejector 18. Consequently, the refrigerant evaporation temperature at the first exterior heat exchanger 22 can be decreased. Thus, the air heating capacity can be improved. The suction pressure of the compressor 11 can be increased by the pressurizing effect of the ejector 18, so that the driving power for the compressor 11 can be reduced, thereby improving the cycle efficiency.

Therefore, both the air heating capacity and the cycle efficiency during the air-heating operation can be improved in the refrigeration cycle device that is capable of switching between the air-heating operation of absorbing heat into the refrigerant in the exterior heat exchangers 22 and 24 and the operation of dissipating heat from the refrigerant in the exterior heat exchangers 22 and 24.

In the present embodiment, the low-pressure side fixed throttle 26 decompresses the refrigerant heat-exchanged in the second exterior heat exchanger 24. The evaporator 27 exchanges heat between the refrigerant decompressed in the low-pressure side fixed throttle 26 and the air to be blown into the vehicle cabin. In the second bypass passage 28, the refrigerant heat-exchanged in the second exterior heat exchanger 24 flows while bypassing the low-pressure side fixed throttle 26 and the evaporator 27.

A switching portion 25 switches between a state in which the refrigerant heat-exchanged in the second exterior heat exchanger 24 flows through the low-pressure side fixed throttle 26 and the evaporator 27 to be drawn into the compressor 11 and a state in which the refrigerant heat-exchanged in the second exterior heat exchanger 24 flows through the second bypass passage 28 to be drawn into the compressor 11.

Thus, by switching the refrigerant flow when the first on/off valve 21a opens the first bypass passage 21, the switching portion 25 can switch between the operation of cooling and dehumidifying the air to be blown into the vehicle cabin in the second exterior heat exchanger 24 (specifically, the air-cooling operation) and the operation of neither cooling nor dehumidifying the air to be blown into the vehicle cabin in the second exterior heat exchanger 24 (specifically, the defrosting operation).

In the present embodiment, the ejector 18 is fixed to the first exterior heat exchanger 22 and the second exterior heat exchanger 24. Thus, the first exterior heat exchanger 22, the second exterior heat exchanger 24, and the ejector 18 configure one heat exchanger unit 34. Consequently, the configuration of the ejector refrigeration cycle device 10 can be simplified.

In the present embodiment, the ejector 18 is disposed such that the axial direction of the nozzle portion 41 is parallel to the longitudinal direction of each of the tank portions 342 and 343 of the first exterior heat exchanger 22 and the second exterior heat exchanger 24. Thus, the body of the heat exchanger unit 34 can be downsized.

In the present embodiment, the first exterior heat exchanger 22 and the second exterior heat exchanger 24 are configured such that the refrigerant flows through the core portion 341 in the horizontal direction, and the ejector 18 is disposed on the side of the core portion 341.

Thus, the body of the heat exchanger unit 34 that has the first exterior heat exchanger 22 and the second exterior heat exchanger 24 of the so-called cross-flow type can be downsized.

Second Embodiment

Figure 9:
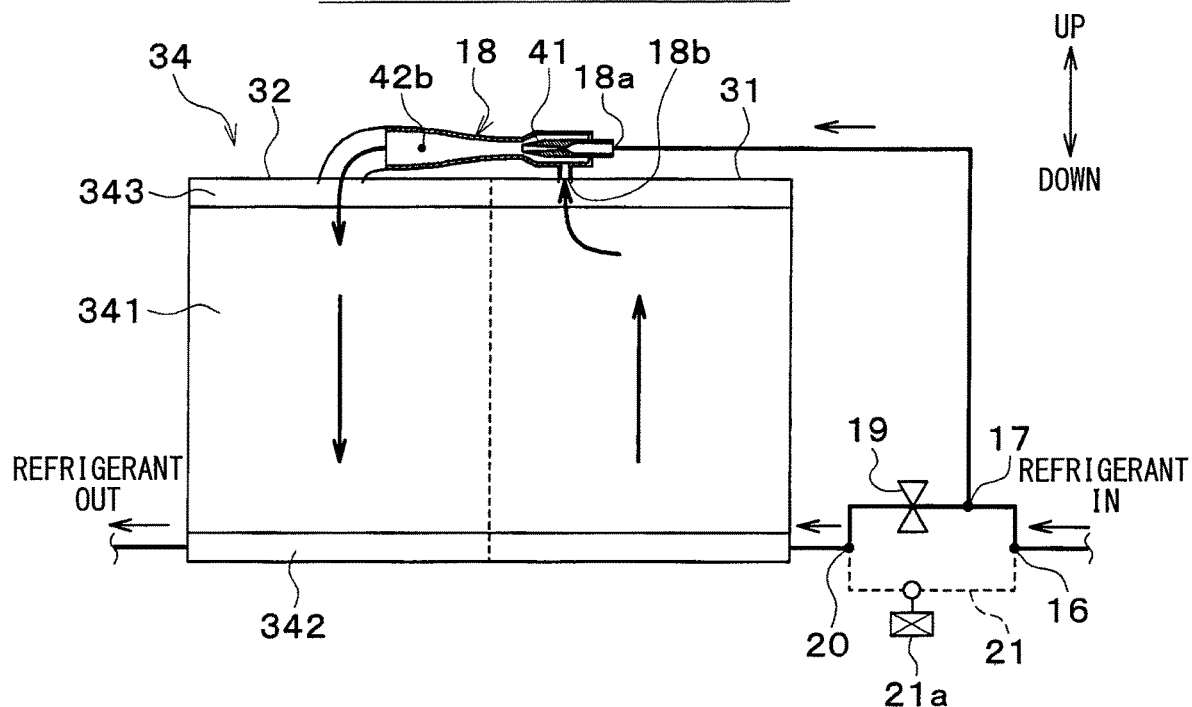
FIG. 9 is a schematic diagram of an exterior heat exchanger unit in a second embodiment, showing the flow state of a refrigerant during an air-heating operation.
Figure 10:
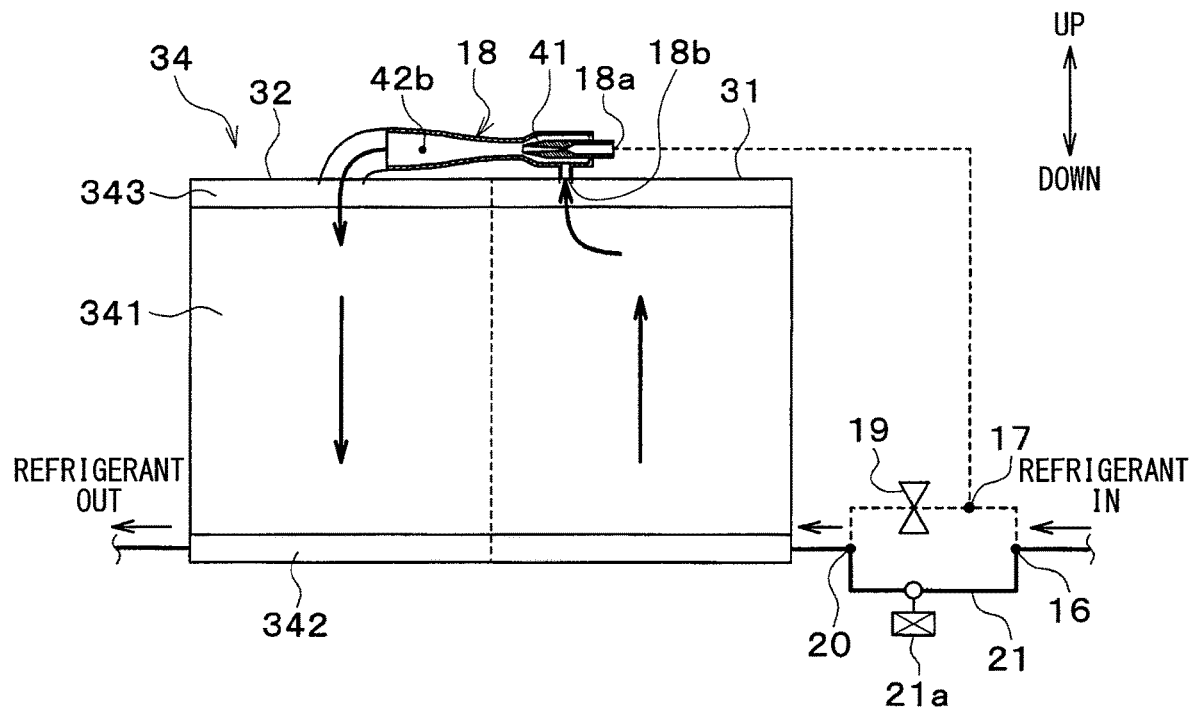
FIG. 10 is a schematic diagram of the exterior heat exchanger unit in the second embodiment, showing the flow state of the refrigerant during the defrosting operation or during the air-cooling operation.

In the above-mentioned embodiment, the exterior heat exchanger unit 34 is the cross-flow type heat exchanger in which the refrigerant as the internal fluid flows in the horizontal direction. On the other hand, in the present embodiment, as shown in FIGS. 9 and 10, the exterior heat exchanger unit 34 is a down-flow type heat exchanger in which the refrigerant as the internal fluid flows in the up and down direction.

A plurality of tubes in the core portion 341 of the exterior heat exchanger unit 34 is arranged in parallel with each other. The plurality of tubes is arranged such that the longitudinal direction of each tube coincides with the up and down direction. The plurality of tubes is arranged side by side in the horizontal direction.

The tank portions 342 and 343 of the exterior heat exchanger unit 34 extend in the direction perpendicular to the longitudinal direction of the tubes (the horizontal direction in the present embodiment) at the respective ends in the longitudinal direction of the tubes (the ends in the up and down direction in the present embodiment).

The refrigerant flow direction in the core portion 341 of the first exterior heat exchanger 22 and the refrigerant flow direction in the core portion 341 of the second exterior heat exchanger 24 are opposite to each other.

The ejector 18 is disposed above the core portion 341. The ejector 18 is disposed such that the axial direction of the nozzle portion 41 is parallel to the longitudinal direction of the tank portion 342 or 343. The ejector 18 is fixed to the outer surface of the tank portion 342 or 343.

For example, the ejector 18 and the exterior heat exchanger unit 34 are formed of an aluminum alloy and joined to each other by brazing.

The refrigerant suction port 18b of the ejector 18 is connected to the tank portions 342 and 343 of the first exterior heat exchanger 22. The refrigerant outlet of the ejector 18 is connected to the tank portions 342 and 343 of the second exterior heat exchanger 24.

In the present embodiment, the first exterior heat exchanger 22 and the second exterior heat exchanger 24 are configured such that the refrigerant flows through the core portion 341 in the up and down direction, and the ejector 18 is disposed above the core portion 341 of the exterior heat exchanger unit 34. Thus, the body of the heat exchanger unit 34 that has the first exterior heat exchanger 22 and the second exterior heat exchanger 24 of the so-called downflow type can be downsized.

Other Embodiments

The above-mentioned embodiments can be combined together as appropriate. Various modifications and changes can be made to the above-mentioned embodiments, for example, in the following way.

Figure 11:
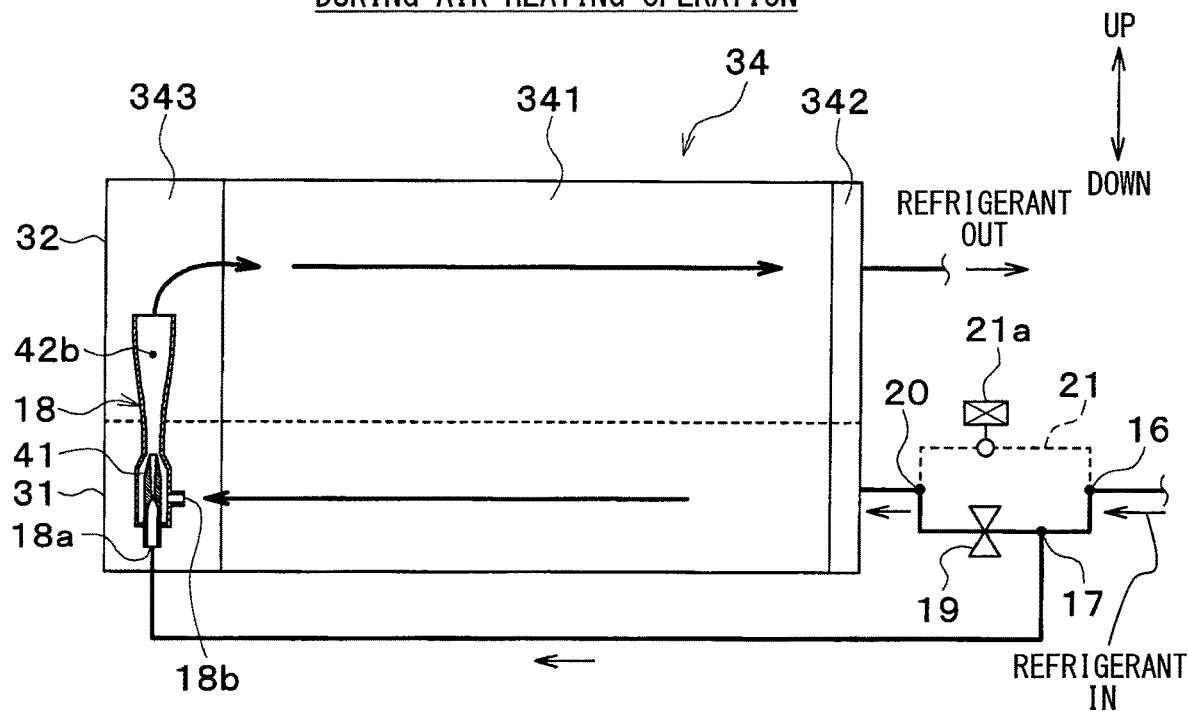
FIG. 11 is a schematic diagram of an exterior heat exchanger unit in another embodiment, showing the flow state of a refrigerant during an air-heating operation.
Figure 12:
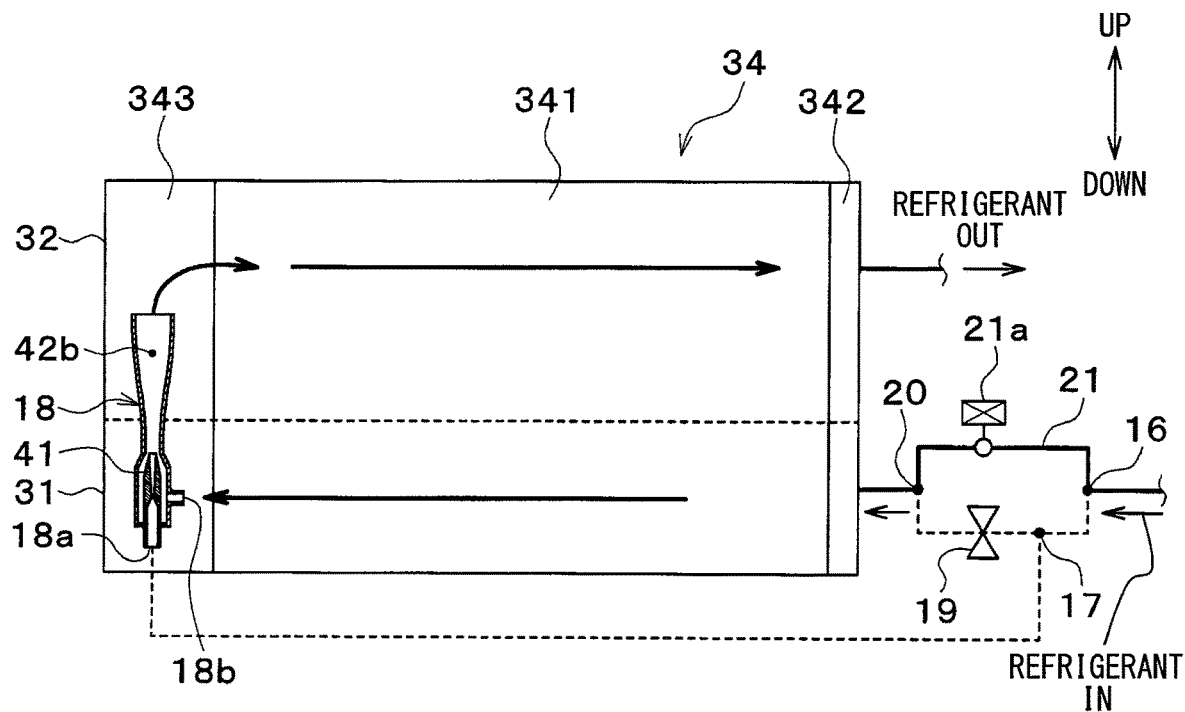
FIG. 12 is a schematic diagram of the exterior heat exchanger unit in another embodiment, showing the flow state of the refrigerant during a defrosting operation or during an air-cooling operation.

(1) Although in the above-mentioned embodiments, the ejector 18 is provided outside the tank portion 342 or 343 of the exterior heat exchanger unit 34, in the present embodiment, as shown in FIGS. 11 and 12, the ejector 18 may be accommodated in the interior of the tank portion 342 or 343 of the exterior heat exchanger unit 34.

Thus, the body of the heat exchanger unit 34 can be further downsized, and the pipe structure between the ejector 18 and each of the first exterior heat exchanger 22 and the second exterior heat exchanger 24 can be simplified.

(2) The exterior heat exchanger unit 34 may be configured to be vertically symmetrical with the above second embodiment. That is, the first exterior heat exchanger 22 and the second exterior heat exchanger 24 may be configured such that the refrigerant flows in the vertical direction in the core portion 341, and the ejector 18 may be disposed below the core portion 341 of the exterior heat exchanger unit 34. Thus, the same operations and effects as those in the above-mentioned second embodiment can be exhibited.

(3) In the above-mentioned embodiment, the partition is provided in the tank portions 342 and 343 such that the refrigerant flow direction in the core portion 341 of the exterior heat exchanger unit 34 makes a U-turn. However, partitions may be provided in the tank portions 342 and 343 such that the refrigerant flow direction in the core portion 341 of the exterior heat exchanger unit 34 makes a plurality of U-turns.

(4) The application of the ejector refrigeration cycle device 10 described in the above embodiments is not limited to a vehicle air conditioner. The ejector refrigeration cycle device may also be applied to, for example, a stationary air conditioner, a freezer-refrigerator, and the like.

(5) In the above-mentioned embodiments, the ejector 18 in use has a fixed nozzle portion in which the refrigerant passage area of the minimum passage area portion does not change. Alternatively, the ejector 18 in use may have a variable nozzle portion capable of changing the refrigerant passage area of the minimum passage area portion.

For example, the variable nozzle portion has a configuration in which a needle-shaped or conical valve body is disposed in a passage of the variable nozzle portion and displaced by an electric actuator or the like to thereby adjust the refrigerant passage area.

(6) In the above-mentioned embodiments, the fixed throttle is used in the high-pressure side fixed throttle 19 and the low-pressure side fixed throttle 26. However, a variable throttle mechanism, such as a thermal expansion valve or an electric expansion valve, may be employed as the high-pressure side fixed throttle 19 and the low-pressure side fixed throttle 26.

(7) Although R134a, R1234yf, or the like is used as the refrigerant in the above-mentioned embodiments, the refrigerant is not limited thereto. For example, R600a, R410A, R404A, R32, R1234yfxf, R407C, or the like may be used as the refrigerant. Alternatively, a mixed refrigerant composed of a plurality of kinds of refrigerants among these refrigerants or the like may be used.

What is claimed is:

1. An ejector refrigeration cycle device comprising:
   a compressor that draws, compresses, and discharges a refrigerant;
   a radiator that exchanges heat between the refrigerant compressed by the compressor and air to be blown into a space to be air-conditioned;
   a first decompressor that decompresses the refrigerant heat-exchanged in the radiator;
   a first exterior heat exchanger that exchanges heat between the refrigerant decompressed in the first decompressor and outside air;
   an ejector including a nozzle portion that decompresses the refrigerant flowing out of the radiator, a refrigerant suction port that draws the refrigerant heat-exchanged in the first exterior heat exchanger by a suction effect of the refrigerant injected from the nozzle portion, and a pressurizing portion that mixes the refrigerant injected from the nozzle portion and the refrigerant drawn from the refrigerant suction port to pressurize the mixed refrigerant;
   a branch portion in which the refrigerant heat-exchanged in the radiator branches to a side of the first decompressor and a side of the nozzle portion;
   a second exterior heat exchanger that exchanges heat between the refrigerant pressurized in the ejector and the outside air;
   a first bypass portion through which the refrigerant heat-exchanged in the radiator flows to the first exterior heat exchanger while bypassing the first decompressor and the nozzle portion;
   an opening/closing portion that opens or closes the first bypass portion;
   a second decompressor that decompresses the refrigerant heat-exchanged in the second exterior heat exchanger;
   an evaporator that exchanges heat between the refrigerant decompressed in the second decompressor and the air to be blown into the space to be air-conditioned;
   a second bypass portion through which the refrigerant heat-exchanged in the second exterior heat exchanger flows while bypassing the second decompressor and the evaporator; and
   a switching portion that switches between a state in which the refrigerant heat-exchanged in the second exterior heat exchanger flows through the second decompressor and the evaporator and is drawn to the compressor, and a state in which the refrigerant heat-exchanged in the second exterior heat exchanger flows through the second bypass portion and is drawn to the compressor.

2. The ejector refrigeration cycle device according to claim 1, wherein
   the ejector is fixed to the first exterior heat exchanger and the second exterior heat exchanger.

3. The ejector refrigeration cycle device according to claim 2, wherein
each of the first exterior heat exchanger and the second exterior heat exchanger includes a core portion having a plurality of tubes, and a tank portion performing at least one of distribution or collection of the refrigerant with respect to the plurality of tubes, and
the ejector is disposed such that an axial direction of the nozzle portion is parallel to a longitudinal direction of the tank portion.

4. The ejector refrigeration cycle device according to claim 3, wherein
the ejector is accommodated in an interior of the tank portion.

5. The ejector refrigeration cycle device according to claim 3, wherein
the first exterior heat exchanger and the second exterior heat exchanger are configured such that the refrigerant flows through the core portion in a horizontal direction, and
the ejector is disposed on a side of the core portion.

6. The ejector refrigeration cycle device according to claim 3, wherein
the first exterior heat exchanger and the second exterior heat exchanger are configured such that the refrigerant flows through the core portion in an up and down direction, and
the ejector is disposed above or below the core portion.

7. An ejector refrigeration cycle device comprising:
a compressor that draws, compresses, and discharges a refrigerant;
a radiator that exchanges heat between the refrigerant compressed by the compressor and air to be blown into a space to be air-conditioned;
a first decompressor that decompresses the refrigerant heat-exchanged in the radiator;
a first exterior heat exchanger that exchanges heat between the refrigerant decompressed in the first decompressor and outside air;
an ejector including a nozzle portion that decompresses the refrigerant flowing out of the radiator, a refrigerant suction port that draws the refrigerant heat-exchanged in the first exterior heat exchanger by a suction effect of the refrigerant injected from the nozzle portion, and a pressurizing portion that mixes the refrigerant injected from the nozzle portion and the refrigerant drawn from the refrigerant suction port to pressurize the mixed refrigerant;
a branch portion in which the refrigerant heat-exchanged in the radiator branches to a side of the first decompressor and a side of the nozzle portion;
a second exterior heat exchanger that exchanges heat between the refrigerant pressurized in the ejector and the outside air;
a first bypass passage through which the refrigerant heat-exchanged in the radiator flows to the first exterior heat exchanger while bypassing the first decompressor and the nozzle portion;
an opening/closing valve that opens or closes the first bypass passage;
a second decompressor that decompresses the refrigerant heat-exchanged in the second exterior heat exchanger;
an evaporator that exchanges heat between the refrigerant decompressed in the second decompressor and the air to be blown into the space to be air-conditioned;
a second bypass passage through which the refrigerant heat-exchanged in the second exterior heat exchanger flows while bypassing the second decompressor and the evaporator; and
a switching valve that switches between a state in which the refrigerant heat-exchanged in the second exterior heat exchanger flows through the second decompressor and the evaporator and is drawn to the compressor, and a state in which the refrigerant heat-exchanged in the second exterior heat exchanger flows through the second bypass portion and is drawn to the compressor.

* * * * *